United States Patent [19]
Neuwirth

[11] Patent Number: 5,626,744
[45] Date of Patent: May 6, 1997

[54] PRESSURE SENSITIVE EXTENDED LIFE FILTER

[75] Inventor: Joseph G. Neuwirth, Gainesville, Ga.

[73] Assignee: Kimberly-Clark Corporation, Neenah, Wis.

[21] Appl. No.: 414,820

[22] Filed: Mar. 31, 1995

[51] Int. Cl.⁶ .................................................. B01D 33/00
[52] U.S. Cl. ........................... 210/97; 55/380; 55/520; 55/529; 55/DIG. 2; 210/354; 210/483; 210/487
[58] Field of Search ........................... 210/356, 359, 210/489, 493.1, 497.1, 97, 354, 483, 486, 487, 497.01; 55/378, 380, 520, 521, 529, DIG. 2; 446/176, 202, 220, 221, 487, 488

[56] References Cited

U.S. PATENT DOCUMENTS

| | | | |
|---|---|---|---|
| 3,364,663 | 1/1968 | Lagerstrom | 55/380 |
| 3,369,348 | 2/1968 | Davis | 55/374 |
| 3,397,704 | 8/1968 | Marinaccio | 55/529 |
| 3,419,151 | 12/1968 | Smith et al. | 210/489 |
| 3,500,618 | 3/1970 | Sokol | 55/484 |
| 3,589,047 | 6/1971 | Hess et al. | 446/176 |
| 3,606,740 | 9/1971 | Ballennie | 55/500 |
| 3,684,096 | 8/1972 | Kretchman | 210/356 |
| 3,905,787 | 9/1975 | Roth | 55/488 |
| 4,056,375 | 11/1977 | Ringel et al. | 55/381 |
| 4,070,170 | 1/1978 | Leinfelt | 55/274 |
| 4,622,148 | 11/1986 | Willinger | 210/356 |
| 5,342,423 | 8/1994 | Taft | 55/483 |
| 5,352,255 | 10/1994 | Taft | 55/274 |

FOREIGN PATENT DOCUMENTS

| | | | |
|---|---|---|---|
| 3624338 | 1/1988 | Germany | 210/356 |
| 351308 | 10/1937 | Italy | 210/356 |
| 1228891 | 10/1986 | Japan | 446/220 |
| 1107885 | 8/1984 | U.S.S.R. | 210/354 |

OTHER PUBLICATIONS

"Comparison of Experimental and Theoretical Efficiencies of Residential Air Filters," *TAPPI Journal*, vol. 77, No. 9, Sep. 1994, pp. 180–186.

*Primary Examiner*—Joseph W. Drodge
*Attorney, Agent, or Firm*—Joseph P. Harps

[57] ABSTRACT

Disclosed is a porous device adapted to remove particulates from a fluid passed through the device. The device includes a porous filtration medium. The medium has a first surface having an area which is adapted to receive the fluid for passage through the medium and a second surface from which the fluid exits the medium. The device is configured to variably increase the area of the first surface in response to a differential in fluid pressure between the first surface and the second surface so as to extend the life of the device. In some embodiments the device is adapted to retain the increase in surface area which acts as a visual indication that the device is reaching its capacity to retain particulates.

21 Claims, 4 Drawing Sheets

PRESSURE SENSITIVE EXTENDED LIFE FILTER

FIELD OF THE INVENTION

The field of the present invention concerns devices which are adapted to remove particulates from fluids such as air and water.

BACKGROUND OF THE INVENTION

Disposable devices which are adapted to remove particulates from a fluid flowing through the device have been commercially available for many years. Such devices are commonly referred to as filters. Those of skill in the art have long recognized the fact that filtration devices gradually become loaded or clogged with the particulates that they are designed to entrap. At some point in the life of these filtration devices replacement their filtration efficiency becomes so inefficient as to require replacement. Many of these types of filters are typically retained, out of sight, within a containing chamber. This is easily recognized where, for example, the filter is a furnace filter which is usually retained within the HVAC ducting system. This arrangement makes it inconvenient, if not difficult, for an individual to determine when the filter is in need of replacement. Currently, in many instances, the determination as to whether the filter should be replaced relies upon an "eyeball" inspection to see whether the filtration medium appears to be heavily loaded with particulates. This arrangement can be unsatisfactory for a number of reasons. First, the filter may appear to be heavily loaded but may still have many days or months of effective use left. Removal and replacement of the filter device at this time would not be cost effective in that the filter device would not have been utilized to its fullest extent. On the other hand, the individual performing the visual inspection of the filter may incorrectly determine that the filter has effective life left when such is not the case. A filter device left in, for example, a furnace under such circumstances could well result in damage to the furnace, itself, as a result of the loss of efficiency of the filter and concomitant circulation of particulates through the HVAC system.

Accordingly, a need has existed in the art for a filter device which gives an alert or visual indication that the time for disposal and replacement has come.

Those of skill in the art have previously addressed the situation with, for example, the incorporation of noise makers in the filtration medium. Upon the filtration medium achieving a high particulate load or clogging, the noise maker goes off to give an alert that the filtration device needs replacement. A problem with such a system is that if nobody is currently intent upon filter replacement and no one comes within hearing range of the noise maker, the alert goes unheeded. Because the alert is based upon the filtration device having been generally fully loaded with particulates at the time it went off, problems will occur shortly thereafter. That is, the filter will shortly cease to efficiently function with possible associated damage to any machinery which the filter device was designed to protect by particulate removal.

Another manner in which those of skill in the art have approached the problem is to design filter devices which have extended surface area and thus extended filtration volume. This design is supposed to extend the life of the filtration device to such an extent that maintenance is virtually "guaranteed" prior to exhaustion of the filter's capacity. These designs have, likewise, proven to be less than totally satisfactory.

OBJECTS OF THE INVENTION

Accordingly, it is an object of the present invention to provide a device for separating particulates from a fluid which automatically expands its filtration capability in response to the device becoming loaded or clogged with particulates.

It is another object of the present invention to provide a device for separating particulates from a fluid which automatically expands its filtration capability in response to the device becoming loaded or clogged with particulates and at the same time giving a visual indication of the fact that the device is nearing its maximum capacity.

These and other objects and the broad scope of applicability of the present invention, will become apparent to those of skill in the art from the details given hereinafter. However, it should be understood that the detailed description of the presently preferred embodiments of the present invention is given only by way of illustration because various changes and modifications well within the spirit and scope of the invention will become apparent to those of skill in the art in view of this detailed description.

SUMMARY OF THE INVENTION

In response to the foregoing difficulties encountered by those of skill in the art, I have invented a porous device adapted to remove particulates from a fluid passed through the device. In particular, the device includes a porous filtration medium. The medium has a first surface having an area which is adapted to receive the fluid for passage through the medium and a second surface from which the fluid exits the medium. It is well known that, as such a filtration medium entraps more and more particulates, a pressure differential develops between the first and second surfaces as a result of the increased difficulty of the passage of the fluid through the medium. Importantly, my device is adapted to variably increase the area of the first surface in response to a differential in fluid pressure between the first surface and the second surface. Said another way, my device can grow additional filtration medium surface in response to an increase in the pressure differential. This feature can greatly extend the effective life of the filtration medium while, in some instances, also serving as a visual indication the time for replacement or other servicing of the filtration medium is near.

In some embodiments, the fluid can be a gas such as air. In other embodiments the fluid can be a liquid such as water.

In some embodiments, the device may include an elastomeric filtration medium which is adapted to expand in response to an increase in fluid pressure differential between the first and second surfaces.

In some embodiments, the device may include a filtration medium which has a generally planar portion that defines at least one orifice or passageway through the planar portion and a spirally wound tubular portion configured about the orifice and which is adapted to unwind and extend in response to an increase in said fluid pressure differential between the first and second surfaces. That is, as the fluid pressure at the first surface increases in comparison to the fluid pressure at the second surface, the spirally wound tubular portion will begin to unwind and extend. Unwinding of the spirally wound portion exposes portions of the filtration medium which have generally not before been exposed to the fluid. Therefore, the device continues to effectively remove particulates after the generally planar portion has become highly loaded with particulates. In some of these embodiments, the spirally wound tubular portion is adapted to rewind and retract to a spirally wound configuration in response to a lack of said fluid pressure differential. In other embodiments, the spirally wound tubular portion is adapted, upon being unwound and extended, to remain in said unwound and extended configuration even when a pressure differential no longer exists between the first and second surfaces. In one particular embodiment, the spirally wound tubular portion has an inside curvature defined by an elastomeric material and an outside curvature defined by a porous film.

In some embodiments the device may include a filtration medium which includes a generally planar portion which defines at least one orifice or passageway through said planar portion and a folded envelope portion configured about the orifice and adapted to unfold in response to an increase in said fluid pressure differential. That is, as the fluid pressure at the first surface increases in comparison to the fluid pressure at the second surface, the folded envelope portion is adapted to unfold. Unfolding of the folded envelope portion exposes portions of the filtration medium which have generally not been exposed to the fluid. Therefore, the device continues to effectively remove particulates after the generally planar portion has become highly loaded with particulates. In some embodiments the device may include a weight attached to the folded envelope portion whereby the envelope is maintained in a generally folded configuration until the fluid pressure differential is sufficient to lift the weight. Accordingly, by varying the amount of the weight, the device can be configured to open at various pressure differentials.

In some embodiments the device may include a filtration medium which includes a generally planar portion which defines at least one orifice or passageway through said planar portion and a telescopically extendable tubular portion configured about the orifice which is adapted to extend telescopically in response to an increase in said fluid pressure differential. That is, as the fluid pressure at the first surface increases in comparison to the fluid pressure at the second surface, the telescopically extendable tubular portion is adapted to telescopically extend. Extension of the telescopically extendable portion exposes portions of the filtration medium which have generally not been exposed to the fluid. Therefore, the device continues to effectively remove particulates after the generally planar portion has become highly loaded with particulates. In some embodiments, the telescopically extendable tubular portion is adapted to return to an unextended configuration in response to a lack of difference in the fluid pressure between the first and second surfaces. In other embodiments, the telescopically extendable tubular portion is adapted, upon being telescopically extended, to remain in the telescopically extended configuration so as to act as a visual indication that the time for replacement or other servicing of the filtration medium is near.

In some embodiments the device may include a filtration medium which includes a generally planar portion which defines at least one orifice or passageway through said planar portion and a folded accordion portion configured about the orifice and adapted to unfold in response to an increase in said fluid pressure differential. That is, as the fluid pressure at the first surface increases in comparison to the fluid pressure at the second surface, the folded accordion portion is adapted to extend and unfold in accordion fashion. Unfolding of the folded accordion portion exposes portions of the filtration medium which have generally not been exposed to the fluid. Therefore, the device continues to effectively remove particulates after the generally planar portion has become highly loaded with particulates. In some embodiments the folded accordion portion is adapted to return to a folded configuration in response to a lack of difference in the fluid pressure between the first and second surfaces. In other embodiments the folded accordion portion is adapted, upon being unfolded, to remain in said unfolded configuration so as to act as a visual indication that the time for replacement or other servicing of the filtration medium is near.

As those of skill in the art will well appreciate, the applications and areas of utilization of the present invention are as varied and numerous as there are filtration devices. For example, the device may be a furnace filter, a water filter, a vacuum cleaner bag or an air cleaner.

DETAILED DESCRIPTION

Figure 1:
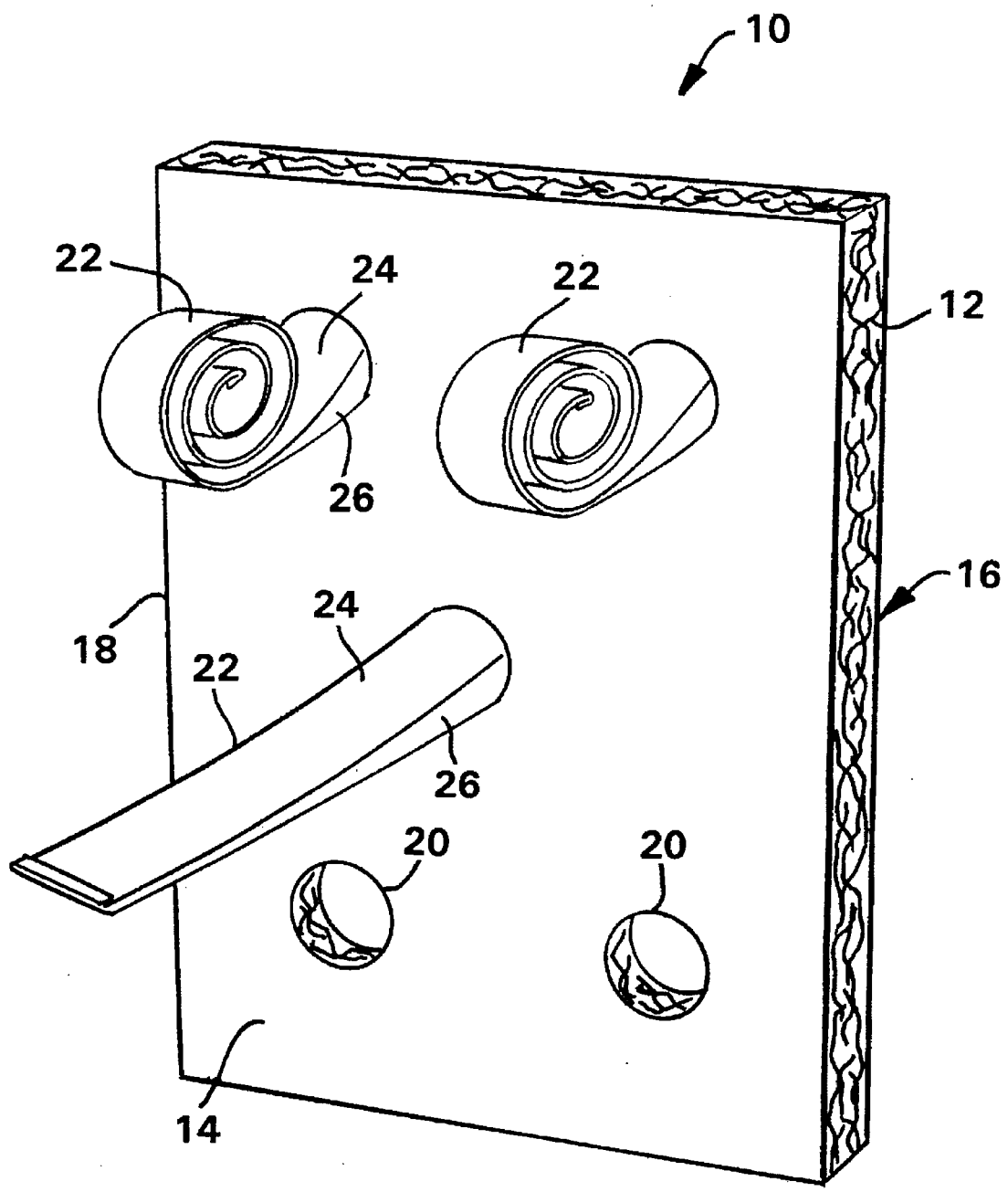
FIG. 1 is a perspective view of one embodiment of the present invention where the filtration device grows additional capacity through the utilization of spirally wound portions which extend in response to the filtration medium becoming loaded with particulate material.

The present invention is a porous device adapted to remove particulates from a fluid passed through the device. The device includes a porous filtration medium. The medium has a first surface having an area which is adapted to receive the fluid for passage through the medium and a second surface from which the fluid exits the medium. The device is configured to variably increase the area of the first surface in response to a differential in fluid pressure between the first surface and the second surface so as to extend the life of the device. In some embodiments the device is adapted to retain the increase in surface area upon removal to the pressure differential. This acts as a visual indication that the device is reaching its capacity to retain particulates and due for disposal and replacement.

Those of skill in the art will readily recognize that the device may be utilized to remove particulates from either a gaseous medium such as air or a liquid such as water. Importantly, the present invention provides a filtration device which has the ability to expand or grow its filtration capability in direct response to the filtration medium becoming loaded or clogged. In essence, the present invention provides a filtration device which includes a primary filtration medium which is designed to do all of the filtration until such time as it becomes loaded or clogged with particulates.

At this point, the device, in response to the loading and clogging of the primary filtration medium, brings a secondary filtration medium on-line by expanding the overall area of the filter. This action, naturally, extends the life of the filtration device as a whole. Filtration life extensions of two times what is achievable without the device are certainly contemplated by the present invention. In some embodiments, the present invention is designed such that the secondary filtration medium is configured to retain the extended state even after cessation of the pressure differential. Those of skill in the art should readily recognize that this feature serves two purposes and achieves a result which has heretofore not been accomplished by the prior art devices. That is to say, the present invention yields a filtration device, in some embodiments, that not only gives and alert or visual signal to a maintenance individual that the effective life of the filter is about to be exhausted but also provides for a "grace period" of extended filtration so that, in the event that replacement and disposal does not occur immediately, the filter will continue to function effectively for an additional considerable period of time.

Importantly and conveniently, the present invention is adaptable for use with any of the many commonly utilized porous filtration media. These include, for example, porous, fibrous structures formed from one or more of polypropylene fibers, polyester fibers, polyurethane fibers, cellulose and the like. It is known that the filtration efficiency of these types of filters may be increased by the conventional application of an electret charge to the filter material. A summary of conventional filtration media, effective filtration velocities, fiber densities, fiber diameters, area densities, filter media thicknesses, and packing densities may be found in an article entitled *Comparison of Experimental And Theoretical Efficiencies of Residential Air Filters*, by Davis, Cornell and Dever. The article may be found in the Tappi Journal, Vol. 77, No. 9 pages 180–186 (September 1994). In some embodiments, the filtration medium may be formed from bicomponent fibers.

In a very simple embodiment, the present invention may be directed toward a device where the filtration medium is formed from an elastomeric material which would stretch and expand in response to an increase in the fluid pressure differential. Such stretching would increase the area of the filter medium while decreasing the thickness of the medium. As a result of the size increase and the thickness decrease, the pores of the filtration material would be somewhat opened up. Accordingly, the life of the filtration material would be effectively extended. Naturally, such a filtration material would, upon cessation of the pressure differential, return to its original size.

Turning now to the drawings where like reference numerals indicate like structure, FIG. 1 discloses one embodiment 10 of the device having a filtration medium 12 which includes a generally planar portion 14. The medium 12 has a first surface 16 having an area which is adapted to receive a fluid containing particulates which is to be passed through the medium 12 and a second surface 18 from which the fluid exits the medium 12 after having had the particulates removed therefrom. The filtration medium 12 defines at least one and, in some circumstances, a plurality of orifices 20 through the planar portion 14. The filtration medium 12 also includes a number of closed end spirally wound tubular portions 22 with each spirally wound tubular portion 22 being configured about a respective orifice 20. In some embodiments the portions 22 may be conical in shape. Each spirally wound tubular portion 22 is adapted to unwind and extend in response to a differential in the fluid pressure exerted on the first surface 16 and the second surface 18. That is to say, as the filtration medium 12 becomes loaded and clogged, the ease of passage of the fluid through the filtration medium 12 will become progressively more difficult. As the ease of passage becomes more difficult, the fluid will exert an ever increasing pressure upon the first surface 16 of the filtration medium 12. Because no counteracting pressure is applied to the second surface 18, a fluid pressure differential will develop. The mechanism of action of the spirally wound portions 22 can be likened to that of well known party favors and noise makers where an individual blows into the tubular, closed end favor and it extends by unwinding. In some circumstances the party favor can also make a noise.

FIG. 1 illustrates three such spirally wound portions 22 with two of the portions 22 being in the wound configuration and the third portion 22 being in a fully extended, unwound configuration. FIG. 1 also illustrates, for purposes of clarity, one of the orifices 20, with its associated spirally wound tubular portion 22 having been removed. In some embodiments the spirally wound tubular portions 22 may be configured to rewind and retract to the spirally wound configuration in response to a cessation in the fluid pressure differential. That is, when the fluid flow is turned off, the spirally wound portions 22 will, much like the party favor, return to their spirally wound configuration. In other embodiments the spirally wound tubular portions 22 may be configured, upon being unwound and extended as a result of the creation of a fluid pressure differential between the first surface 16 and the second surface 18, to remain in the unwound and extended configuration. By remaining in the unwound configuration, the spirally wound portions 22 give a maintenance individual a visual indication that replacement and disposal of the device 10 should be carried out. In the specific embodiment illustrated in FIG. 1, each spirally wound tubular portion 22 has an inside curvature 24 defined by an elastomeric material and an outside curvature 26 defined by a porous film. Positioning of the elastomeric material on the inside curvature 24 results in the tubular portion 22 automatically retracting when no pressure differential exists between the first surface 16 and the second surface 18.

Figure 2:
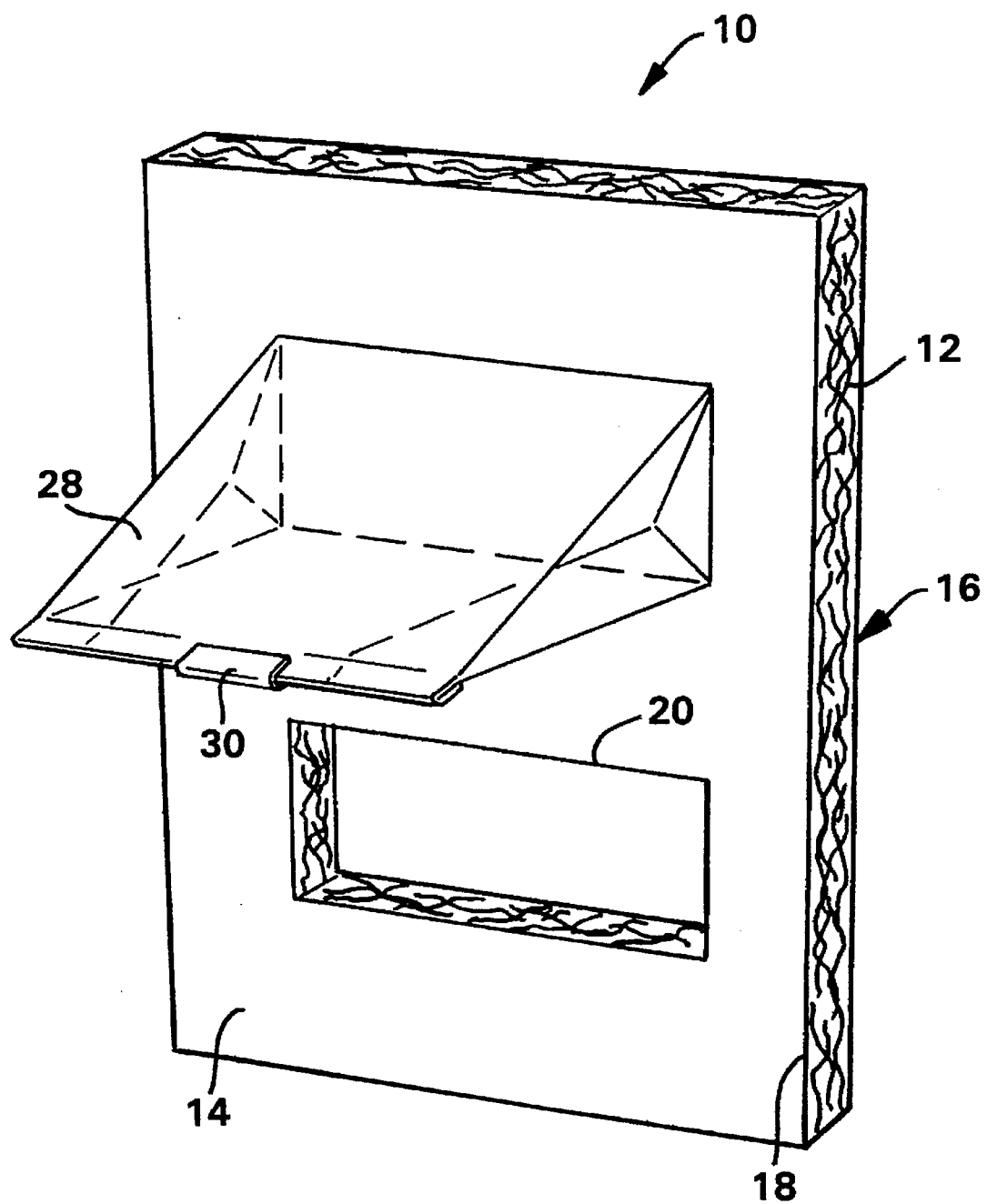
FIG. 2 is a perspective view of another embodiment of the present invention where the filtration device grows additional capacity through the utilization of one or more folded envelope portions which extend in response to the filtration medium becoming loaded with particulate material.

FIG. 2 discloses another embodiment 10 of the device having a filtration medium 12 which includes a generally planar portion 14. The medium 12 has a first surface 16 having an area which is adapted to receive a fluid containing particulates which is to be passed through the medium 12 and a second surface 18 from which the fluid exits the medium 12 after having had the particulates removed therefrom. The filtration medium 12 defines at least one and, in some circumstances, a plurality of orifices 20 through the planar portion 14. The filtration medium 12 also includes a number of folded envelope portions 28 with each folded envelope portion 28 being configured about a respective orifice 20. Each folded envelope portion 28 is configured about an orifice 20 and adapted to unfold in response to a differential in the fluid pressure exerted on the first surface 16 and the second surface 18. That is to say, as the filtration medium 12 becomes loaded and clogged, the ease of passage of the fluid through the filtration medium 12 will become progressively more difficult. As the ease of passage becomes more difficult, the fluid will exert an ever increasing pressure upon the first surface 16 of the filtration medium 12. Because no counteracting pressure is applied to the second surface 18, a fluid pressure differential will develop.

FIG. 2 illustrates a device 10 having two such folded envelope portions 28 with one of the portion 28 being in the folded configuration and one of the portions 28 being in the extended, unfolded configuration. FIG. 2 also illustrates, for purposes of clarity, one of the orifices 20 with its associated spirally wound tubular portion 22 having been removed. In some embodiments, the folded envelope portions 28 may be configured to refold to the folded configuration in response to a cessation in the fluid pressure differential. That is, when the fluid flow is turned off, the folded envelope portions 28 will return to their folded configuration. As an aid to the refolding, process, a weight 30 can be appropriately attached to the folded envelope portion 28. The weight may also serve as a mechanism where the folded envelope portion 28 will not deploy until the fluid pressure differential has increased to a point where the weight can be lifted. This mechanism guards against premature deployment of the folded envelope portion 28. In other embodiments the folded envelope portions 28 may be configured, upon being unfolded and extended as a result of the creation of a fluid pressure differential between the first surface 16 and the second surface 18, to remain in the unfolded and extended configuration. By remaining in the unfolded configuration, the folded envelope portions 28 give a maintenance individual a visual indication that replacement and disposal of the device 10 should be carried out.

Figure 3:
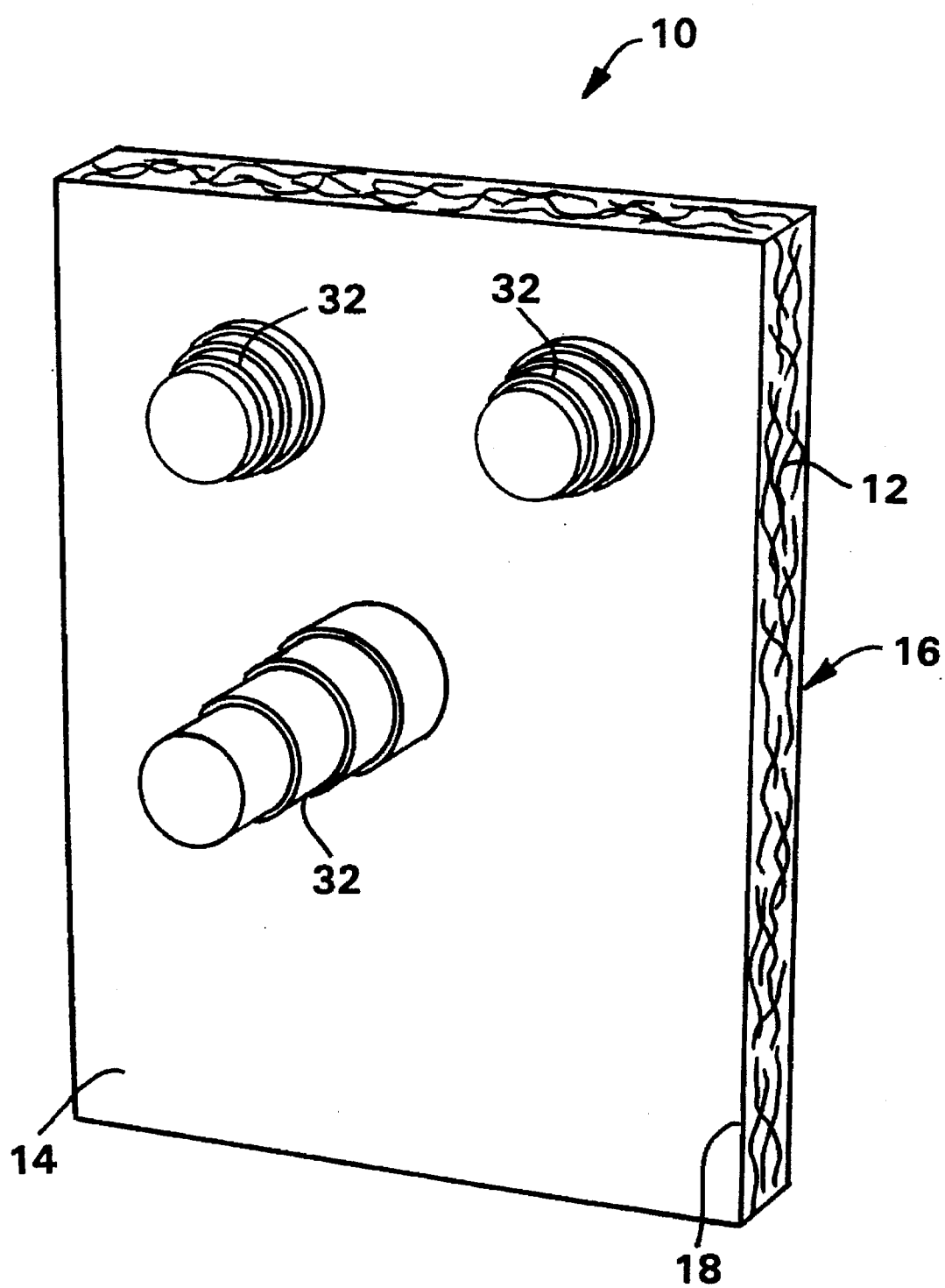
FIG. 3 is a perspective view of yet another embodiment of the present invention where the filtration device grows additional capacity through the utilization of one or more telescopically extendable portions which extend in response to the filtration medium becoming loaded with particulate material.

FIG. 3 discloses yet another embodiment 10 of the device having a filtration medium 12 which includes a generally planar portion 14. The medium 12 has a first surface 16 having an area which is adapted to receive a fluid containing particulates which is to be passed through the medium 12 and a second surface 18 from which the fluid exits the medium 12 after having had the particulates removed therefrom. The filtration medium 12 defines at least one and, in some circumstances, a plurality of orifices 20 through the planar portion 14. The filtration medium 12 also includes a number of closed end, telescopically extendable tubular portions 32 with each telescopically extendable tubular portion 32 being configured about a respective orifice 20. Each telescopically extendable portion 32 is adapted to extend in response to a differential in the fluid pressure exerted on the first surface 16 as compared to that exerted on the second surface 18. That is to say, as the filtration medium 12 becomes loaded and clogged, the ease of passage of the fluid through the filtration medium 12 will become progressively more difficult. As the ease of passage becomes more difficult, the fluid will exert an ever increasing pressure upon the first surface 16 of the filtration medium 12. Because no counteracting pressure is applied to the second surface 18, a fluid pressure differential will develop.

FIG. 3 illustrates three such telescopically extendable tubular portions 32 with two of the portions 32 being in the closed, untelescoped configuration and the third portion 32 being in a fully extended, telescoped configuration. In some embodiments the telescopically extendable tubular portions 32 may be configured to retract to the closed untelescoped configuration in response to a cessation in the fluid pressure differential. That is, when the fluid flow is turned off, the telescopically extendable portions 32 will return to their closed, untelescoped configuration. Those of skill in the art will readily recognized that the degree to which the telescopically extendable portions 32 will return to their closed, untelescoped configuration will, to some extent, be governed by the amount of particulates entrapped within the portions 32. As the amount of entrapped particulates increases, the degree of complete return will decrease as a result of interference by the particulates in the return mechanism. In other embodiments the telescopically extendable portions 32 may be configured, upon being extended and telescoped as a result of the creation of a fluid pressure differential between the first surface 16 and the second surface 18, to remain in the extended and telescoped configuration. By remaining in the telescoped and extended configuration, the telescopically extendable tubular portions 32 give a maintenance individual a visual indication that replacement and disposal of the device 10 should be carried out.

Figure 4:
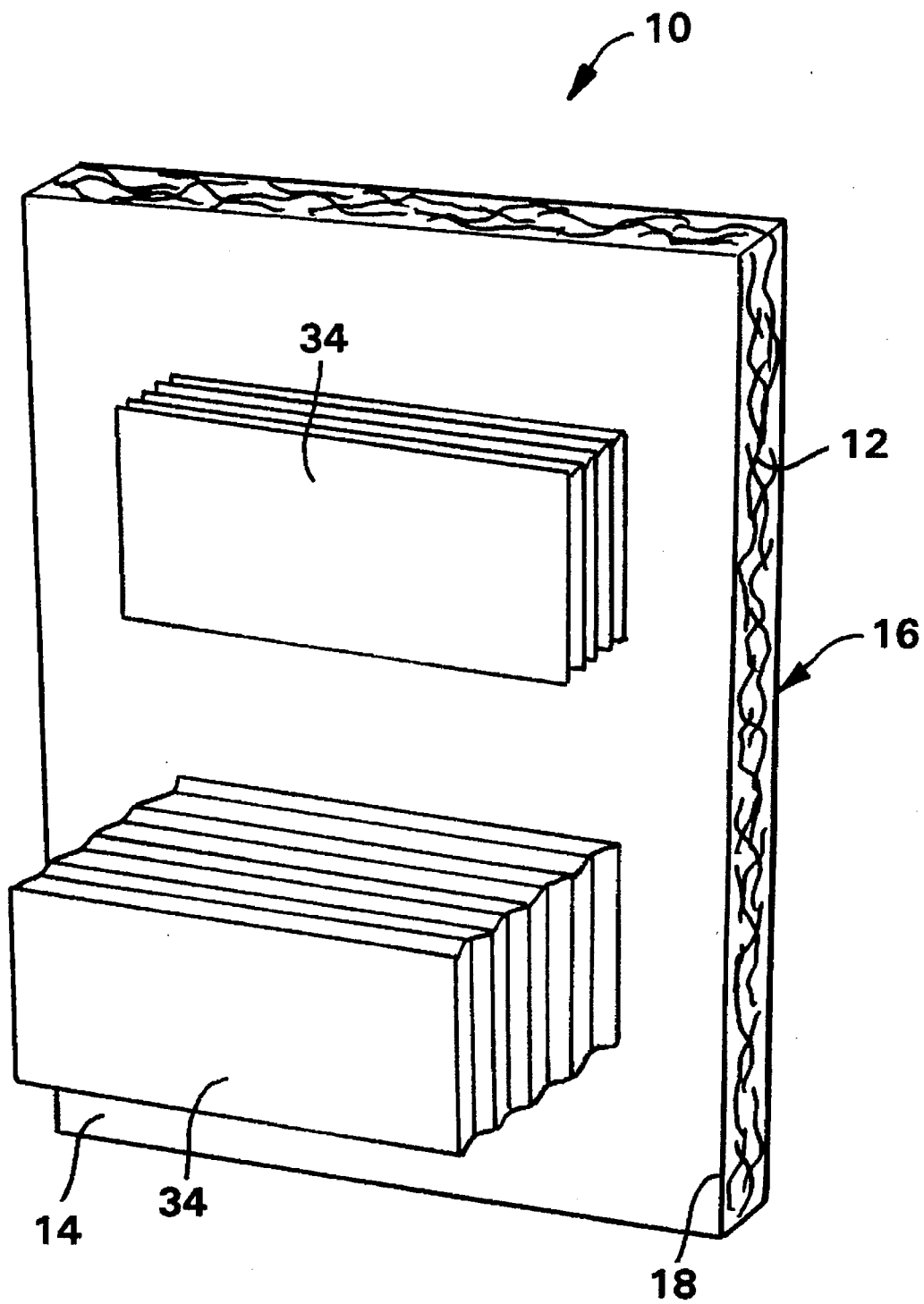
FIG. 4 is a perspective view of still another embodiment of the present invention where the filtration device grows additional capacity through the utilization of one or more folded accordion portions which extend in response to the filtration medium becoming loaded with particulate material.

FIG. 4 discloses still another embodiment 10 of the device having a filtration medium 12 which includes a generally planar portion 14. The medium 12 has a first surface 16 having an area which is adapted to receive a fluid containing particulates which is to be passed through the medium 12 and a second surface 18 from which the fluid exits the medium 12 after having had the particulates removed therefrom. The filtration medium 12 defines at least one and, in some circumstances, a plurality of orifices 20 through the planar portion 14. The filtration medium 12 also includes a number of pleated or otherwise folded accordion portions 34 with each folded accordion portion 34 being configured about a respective orifice 20. Each folded accordion portion 34 is adapted to unfold and extend in response to a differential in the fluid pressure exerted on the first surface 16 and the second surface 18. That is to say, as the filtration medium 12 becomes loaded and clogged, the ease of passage of the fluid through the filtration medium 12 will become progressively more difficult. As the ease of passage becomes more difficult, the fluid will exert an ever increasing pressure upon the first surface 16 of the filtration medium 12. Because no counteracting pressure is applied to the second surface 18, a fluid pressure differential will develop.

FIG. 4 illustrates a device 10 having two such folded accordion portions 34 with one of the portions 34 being in the folded configuration and the other portion 34 being in a fully extended configuration. In some embodiments the folded accordion portions 34 may be configured to refold and retract to the folded configuration in response to a cessation in the fluid pressure differential. That is, when the fluid flow is turned off, the folded accordion portions 34 will return to their spirally wound configuration. In other embodiments the folded accordion portions 34 may be configured, upon being unfolded and extended as a result of the creation of a fluid pressure differential between the first surface 16 and the second surface 18, to remain in the unfolded and extended configuration. By remaining in the unwound configuration, the folded accordion portions 34 give a maintenance individual a visual indication that replacement and disposal of the device 10 should be carried out.

It is to be understood that variations and modifications of the present invention may be made without departing from the scope of the invention. It is also to be understood that the scope of the present invention is not to be interpreted as limited to the specific embodiments disclosed herein, but only in accordance with the appended claims when read in light of the foregoing disclosure.

What is claimed is:

1. A device adapted to remove particulates from a fluid passed through the device, the device comprising:

a porous filtration medium defining at least one orifice through said planar portion, the planar portion comprising:

a first surface being arranged to receive unfiltered fluid for passage through the medium;

a second surface from which the fluid exits the medium the medium also comprising;

a respective spirally wound tubular portion having an area and configured about each of the at least one orifice; and wherein each of the at least one spirally wound tubular portion is adapted to unwind and extend from the second surface in response to a fluid pressure differential between the first surface and the second surface; and whereby the device is adapted to variably increase the area of the at least one tubular portion in response to an increase in the differential in fluid pressure between the first surface and the second surface.

2. The device according to claim 1, wherein the fluid is a gas.

3. The device according to claim 2, wherein the gas comprises air.

4. The device according to claim 1, wherein the fluid is a liquid.

5. The device according to claim 4, wherein the liquid comprises water.

6. The device according to claim 1, wherein the spirally wound tubular portion is adapted to rewind and retract to a spirally wound configuration in response to a lack of said fluid pressure differential.

7. The device according to claim 1, wherein each of the at least one spirally wound tubular portion is adapted, upon being unwound and extended, to remain in said unwound and extended configuration.

8. The device according to claim 1, wherein each of the at least one spirally wound tubular portion has an inside curvature defined by an elastomeric material and an outside curvature defined by a porous film.

9. The device according to claim 1, wherein device is a furnace filter.

10. The device according to claim 1, wherein the device is an air cleaner.

11. The device according to claim 1, wherein the device is a water filter.

12. The device according to claim 1, wherein the device is a vacuum cleaner filter.

13. A device adapted to remove particulates from a fluid passed through the device, the device comprising:

a porous filtration medium defining at least one orifice through said planar portion, the planar portion comprising:
a first surface being arranged to receive unfiltered fluid for passage through the medium;
a second surface from which the fluid exits the medium the medium also comprising;
a respective telescopically extendable tubular portion having and area and configured about each of the at least one orifice; and wherein each of the at least one telescopically extendable tubular portion is adapted to extend telescopically from the second surface in response to a fluid pressure differential between the first surface and the second surface; and whereby the device is adapted to variably increase the area of the at least one tubular portion in response to an increase in the differential in fluid pressure between the first surface and the second surface.

14. The device according to claim 13, wherein each of the at least one telescopically extendable tubular portion is adapted to return to an unextended configuration in response to a lack of said fluid pressure differential.

15. The device according to claim 13, wherein each of the at least one telescopically extendable tubular portion is adapted, upon being telescopically extended, to remain in a telescopically extended configuration.

16. The device according to claim 13, wherein the fluid is a gas.

17. The device according to claim 13, wherein the fluid is a liquid.

18. The device according to claim 13, wherein the device is a furnace filter.

19. The device according to claim 13, wherein the device is an air cleaner.

20. The device according to claim 13, wherein the device is a water filter.

21. The device according to claim 13, wherein the device is a vacuum cleaner filter.

* * * * *